United States Patent
Normile

(10) Patent No.: US 6,438,165 B2
(45) Date of Patent: *Aug. 20, 2002

(54) METHOD AND APPARATUS FOR ADVANCED ENCODER SYSTEM

(75) Inventor: James Oliver Normile, 18033 Skyline Blvd., Woodside, CA (US) 94062

(73) Assignees: LG Electronics, San Jose; James Oliver Normile, Woodside, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,988

(22) Filed: Mar. 9, 1998

(51) Int. Cl.[7] ................................. H04N 7/12
(52) U.S. Cl. ..................................... 375/240
(58) Field of Search .................. 348/405, 409, 348/413, 415, 416, 155; 375/240; 382/305, 190, 236

(56) References Cited

U.S. PATENT DOCUMENTS

| | | | | |
|---|---|---|---|---|
| 5,267,334 A | * | 11/1993 | Normille et al. | 348/409 |
| 5,526,052 A | * | 6/1996 | Ar | 348/405 |
| 5,774,593 A | * | 6/1998 | Zick et al. | 382/236 |
| 5,796,952 A | * | 8/1998 | Davis et al. | 709/224 |
| 5,801,765 A | * | 9/1998 | Gotoh et al. | 348/155 |
| 5,805,746 A | * | 9/1998 | Miyatake et al. | 382/305 |
| 6,192,151 B1 | * | 2/2001 | Miyatake et al. | 382/190 |

* cited by examiner

*Primary Examiner*—Chris Kelley
*Assistant Examiner*—Allen Wong
(74) *Attorney, Agent, or Firm*—Peninsula Law Group; Daniel Hopen

(57) ABSTRACT

A system for encoding data blocks and methods of operating the same result in a video encoder that provides advanced intelligent encoding. The video encoder comprises DCT (discrete cosine transformer) resources configured to DCT the data blocks. Quantizing resources is coupled to the DCT resources configured to quantize the data blocks to provide quantized data blocks. Inverse quantizing resources is coupled to the quantizing resources to inverse quantize the quantized data blocks. Frame reconstruction resources is coupled to the inverse quantizing resources configured to reconstruct previous compressed frames. Motion estimation resources is coupled to the frame reconstruction resources configured to provide predicted data blocks. Subtraction resources is coupled to the DCT resources and the motion estimation resources to subtract the data blocks and the predicted data blocks. An output data buffer is coupled to the quantizing resources configured to provide a data rate signal to the quantizing resources for modifying quantizer values of the quantizing resources in order to maintain a particular target output data rate of the compressed image data.

13 Claims, 5 Drawing Sheets

METHOD AND APPARATUS FOR ADVANCED ENCODER SYSTEM

BACKGROUND OF THE INVENTION

1. Field of the Invention

The present invention relates to encoding of video images and more particularly to implementing features to an encoder which improves the quality of the encoded video images.

2. Description of the Related Arts

As the Internet becomes more and more popular, more and more kinds data are being transferred using the Internet. The internet and other channels of communication have bandwidth limitations. Data compression is often used to maximize data transmission over such limited bandwidth channels. Most people access the Internet using fixed rate channels such as telephone lines. The fixed rate channels present problems for viewing video. Typically, the transfer of video images require high bandwidth channels. However, compression techniques have reduced the need for the high bandwidth channels but at the expense of choppy low quality video images.

Thus, particularly in low bitrate communication, image quality and encoder performance are still in need of improvement to achieve the quality of broadcast or real-time video at the approximate 30 frames per second. Typically, in any video film clip there are many instances when sequential picture frames are very similar from one frame to the next. Digitizing each frame and comparing the two dimensional digital arrays result in samples which are highly correlated. In particular, adjacent samples within a picture are very likely to have similar intensities. Exploiting this correlation and others within each picture and from picture to picture enables encoders to compress picture sequences more effectively.

The modern encoders for encoding video images possess the intelligence which takes advantage of the many correlations between the pictures of a video sequence. Decoders on the other hand follow directions already encoded in the bitstream by the encoders and thus are relative simple compared to the encoder. During encoding, the encoders identify areas in motion, determine optimal motion vectors, control bitrate, control data buffering such that underflow and overflow do not occur, determine where to change quantization, determine when a given block can simply be repeated, determine when to code by intra and inter techniques, and vary all of these parameters and decisions dynamically so as to maximize quality for a given situation. However, even the modem encoders still do not provide the intelligence necessary to produce smooth video at low communication bitrates.

Therefore, it is desirable to provide an encoding apparatus and methods of operating the same which more intelligently manipulates correlations between individual pictures.

SUMMARY OF THE INVENTION

The present invention provides an apparatus for advanced encoders and methods for operating the same which result in improved image quality of encoded images. The novel video encoder is based on identifying particular properties of input images and refining the coding techniques of the encoding engine to reflect the identified properties of the input images. Thus, according to one aspect of the invention, the video encoder for encoding input images having a plurality of data blocks to provide compressed image data comprises DCT (discrete cosine transformer) resources configured to DCT the data blocks. Quantizing resources is coupled to the DCT resources configured to quantize the data blocks to provide quantized data blocks. Inverse quantizing resources is coupled to the quantizing resources to inverse quantize the quantized data blocks. Frame reconstruction resources is coupled to the inverse quantizing resources configured to reconstruct previous compressed frames. Motion estimation resources is coupled to the frame reconstruction resources configured to provide predicted data blocks. Subtraction resources is coupled to the DCT resources and the motion estimation resources to subtract the data blocks and the predicted data blocks. An output data buffer is coupled to the quantizing resources configured to provide a data rate signal to the quantizing resources for modifying quantizer values of the quantizing resources in order to maintain a particular target output data rate of the compressed image data.

According to another aspect of the invention, the video encoder further comprises image preclassifying resources coupled between the subtraction resources and the DCT resources configured to preclassify the data blocks as active and inactive regions wherein the quantizing resources responsive to preclassification of the data blocks limits quantizer values for the active regions. The combination of the preclassifying resources and the quantizing resources produces variable rate coding which affords constant image quality at variable data rates. Because the active regions are coded with a relatively fixed quantization and the inactive regions are coded with larger quantization values, the actives regions produce better image quality than the inactive regions, particularly in situations where data rates are reduced.

According to another aspect of the invention, the frame reconstruction resources includes an automatic scene change detector configured to determine whether to code inverse quantized data blocks as intra frames or predicted frames. The automatic scene change detector includes a scene similarity detector configured to compare an current frame with a previous frame to determine similarity between the previous frame and the current frame. A frame comparator is configured to provide a combination of distortion, differences in luminance, and color histogram information for comparing the previous frame with the current frame. The scene similarity detector directs the current frame to be encoded as an intra frame when the combination of distortion, differences in luminance, and color histogram information exceed an adaptively determined threshold.

According to yet another aspect of the invention, the frame reconstruction resources includes a reference picture controller configured to determine whether to code inverse quantized data blocks based upon a reference frame or a previous frame. The reference picture controller includes a frame comparator configured to compare a previous frame and a reference frame with a current frame to determine whether the previous frame or the reference frame is more similar to the current frame, and a frame encoder coupled to the frame comparator configured to encode the current frame based on a selected more similar frame from the frame comparator.

According to another aspect of the invention, the reference picture controller includes a reference picture store coupled to the frame encoder configured to receive updates of additional background information for the reference frame from the reference frame comparator. For instance, whenever the automatic scene change detector directs the current frame to be encoded as an intra frame, the reference picture controller updates the reference picture store to include the intra frame.

According to yet another aspect of the invention, the reference picture controller includes a synthetic background generator which generates a synthetic background as the reference frame for encoding the current frame. The synthetic background generator includes animation by a java applet. Moreover, to conserve bandwidth, the frame reconstruct resource codes foreground regions of images and use the synthetic background as the reference image.

According to yet another aspect of the invention, the motion estimation resources constrains motion vectors to be smooth relative to each other. The motion estimation resources includes a motion vector search engine configured to receive a previous frame and a current frame to search an optimal motion vector, a motion vector biasor coupled to the motion vector search engine configured to bias the optimal motion vector to favor a direction consistent with that found in surrounding areas of the optimal motion vector and provide a modified distortion, and a signal to noise ratio (SNR) comparator configured to compare SNR of additional motion vector searches performed by the motion vector search engine in a direction consistent with the optimal motion vector with the modified distortion to select the motion vector associated with minimum distortion. By constraining the motion vectors to be smooth relative to each other, the motion estimation resources extracts zoom information from a zooming image instead of having to encode the entire zooming image. The overall amount of data generated by the encoder is reduced.

An apparatus and method of operating an advanced encoder are provided whereby the encoder engine provides variable rate coding, automatic scene change detection, reference picture determination and update, and motion vector smoothing. The variable rate coding maintains a constant image quality at a variable data rate, while the automatic scene change detection determines when input frame are coded as intra frames based on a combination of distortion, differences in luminance, and color histogram measurements from frame encoding to determine similarity between temporally adjacent frames. The reference picture determination choose the reference picture or the previous picture as the bases for encoding an input image. The motion vector smoothing preferentially biases the motion vectors so that the overall motion vector field is more smooth than it would otherwise improving the quality of motion estimation from one frame to another.

Other aspects and advantages of the present invention can be seen upon review of the figures, the detailed description, and the claims which follow.

DETAILED DESCRIPTION OF THE INVENTION

Figure 1:
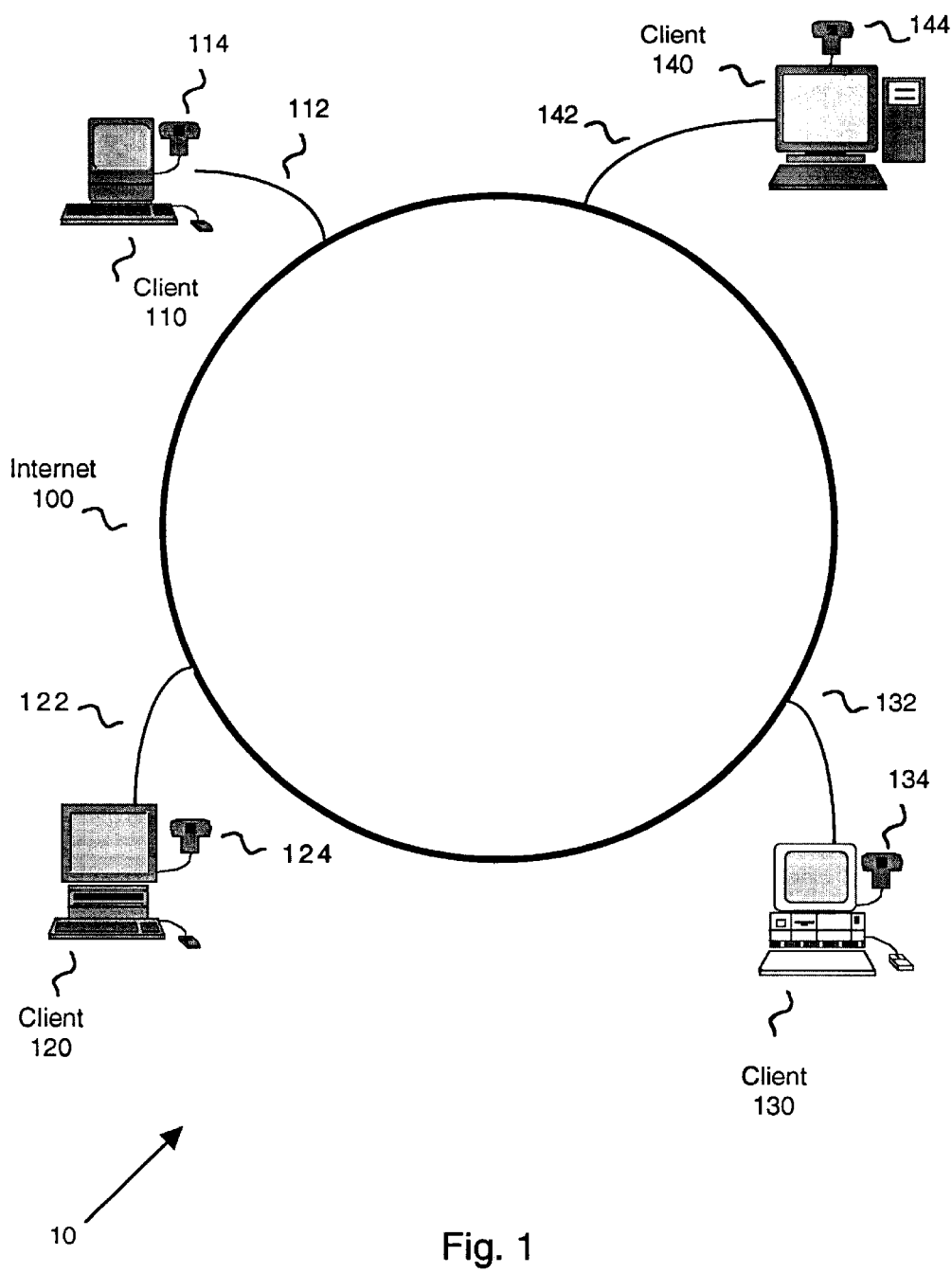
FIG. 1 illustrates a system level block diagram of a video conferencing system.

The invention will be described with respect to the Figures in which FIG. 1 generally shows a video conferencing system 10. The video conferencing system 10 includes an Internet 100, client 110, client 120, client 130, and client 140. The Internet 100 provides TCP/IP (Transmission Control Protocol over Internet Protocol). Other represented segments operating the TCP/IP including intranets, local area, and telephone networks are also suitable.

Network connection 112 provides the client 110 access to the Internet 100. Network connection 122 provides the client 120 access to the Internet 100. Network connection 132 provides the client 130 access to the Internet 100. Network connection 142 provides the client 140 access to the Internet 100. Clients 110, 120, 130, and 140 include logic circuits that are programmed to perform a series of specifically identified operations for video conferencing on the Internet 100. Video camera 114 provides audio/video data from client 110 for transfer to another client on the Internet 100. Client 140 for example, is configured to receive the audio/video data from client 110 and transfers the audio/video data from camera 144 to client 110 on the Internet 100. Similarly, client 120 includes camera 124, and client 130 includes camera 134 for video conferencing on the Internet 100. Thus, clients 110, 120, 130, and 140 include video conferencing links via the Internet 100 to provide video conferencing between the clients.

The clients 110, 120, 130, and 140 include logic circuits that are programmed to perform a series of specifically identified operations for encoding and decoding compressed bitstream video data. Video encoding techniques such as H.261 and H.324 standards have been developed for use in video teleconferencing and video telephony applications that provide a plurality of display frames wherein each display frame includes a plurality of display blocks.

For example, each picture is divided into groups of blocks (GOBs). A group of blocks (GOB) includes multiples of 16 lines depending on the picture format. Each GOB is divided into macroblocks. A macroblock relates to 16 pixels by 16 pixels of y, the luminance, and the spatially corresponding 8 pixels by 8 pixels of u and v, the two color components. Further, a macroblock includes four luminance blocks and the two spatially corresponding color difference blocks. Each luminance or chrominance block relates to 8 pixels by 8 pixels of y, u or v. A more detailed description is contained in Document LBC-95-251 of the International Telecommunication Union Telecommunication Standardization Sector Study Group 15 entitled "Draft Recommendations H.263 (Video coding for low bitrate communication)", contact Karel Rijkse, Tel: +31 70 332 8588; the Draft Recommendations H.263 (Video coding for low bitrate communication) is herein incorporated by reference in its entirety.

Figure 2:
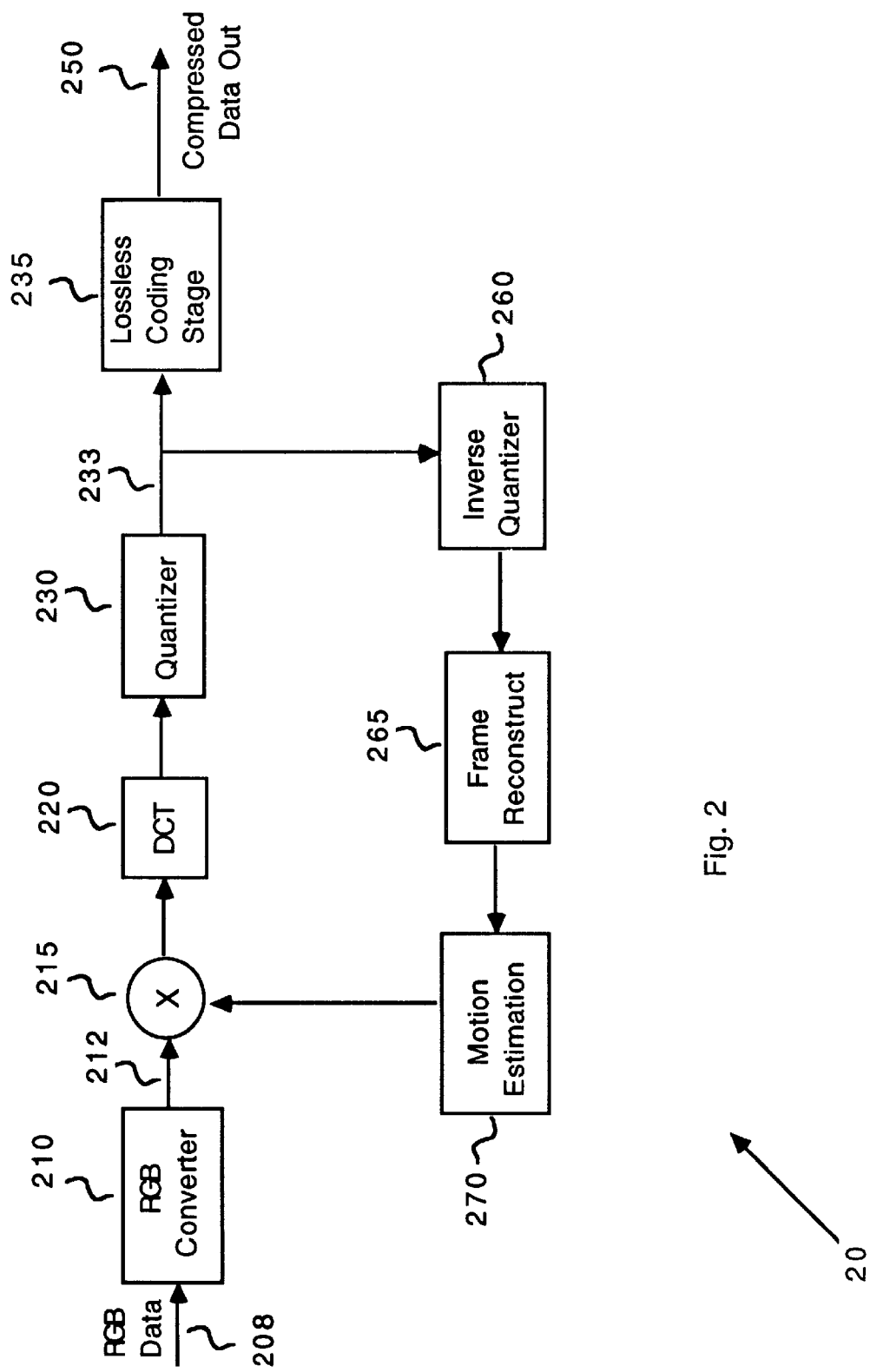
FIG. 2 illustrates a block diagram of a previous art video encoder.

FIG. 2 shows a block diagram of a video encoder 20 as generally known in the video encoding arts. Red Green Blue (RGB) data on line 208 provides video input to RGB converter 210. The RGB converter 210 codes the RGB data to luminance and two color difference components y,u, and v, respectively. The RGB converter 210 provides an output on line 212 to a subtractor 215. The subtractor 215 subtracts the output from motion estimation block 270 and the yuv data on line 212. The discrete cosine transform (DCT) block 220 provides the input to the quantizer 230. The output of the quantizer 230 on line 233 provides inputs to the inverse quantizer 260 and a lossless coding stage 235. The output of the inverse quantizer 260 provides the input to a frame reconstruct block 265. The motion estimation block 270 receives the output of the frame reconstruct block 265. The DCT block 220, quantizer 230, inverse quantizer 260, the frame reconstruct block 265 and the motion estimation block 270 provide a transform based, motion compensated, predictive engine for encoding that is used in the Motion Picture Experts Group (MPEG) encoding. The MPEG encoding provides a plurality of display frames wherein each display frame includes a plurality of display blocks. Other video encoding techniques such as H.261, H.263, H.324, MPEG-2, and MPEG-4 standards are also encoded in a similar manner.

Figure 3:
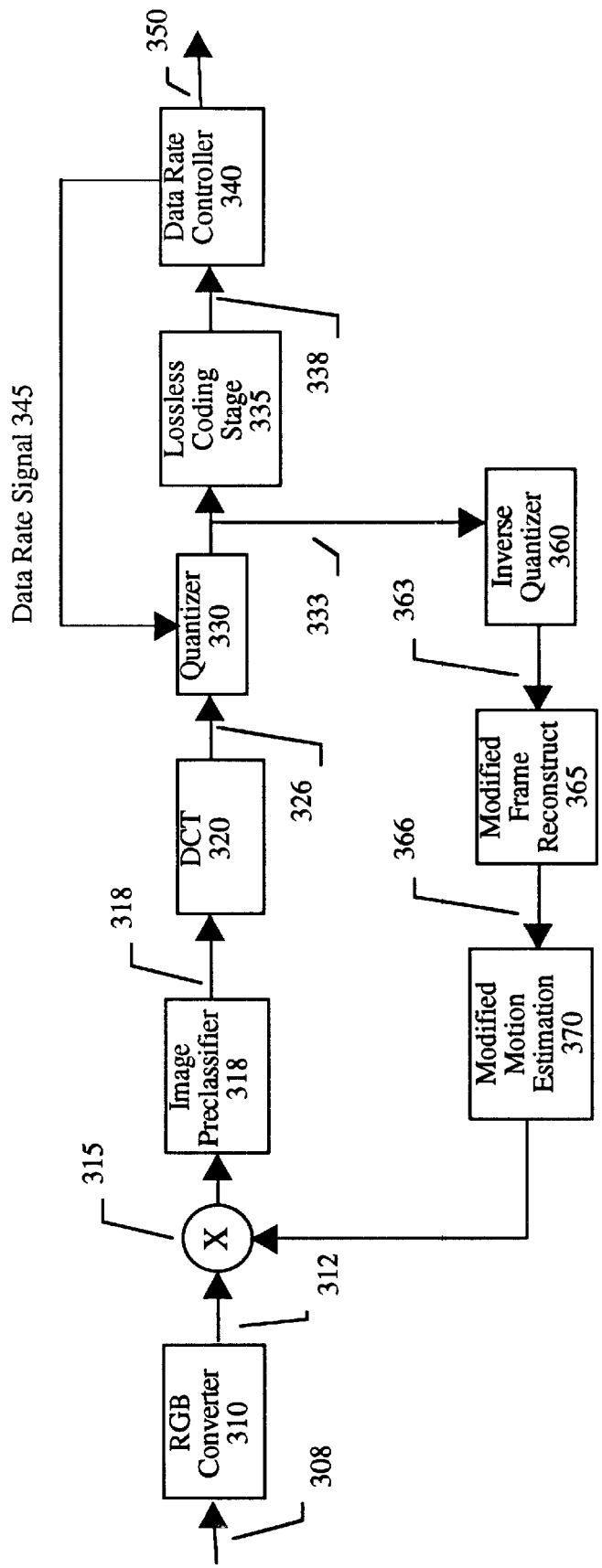
FIG. 3 illustrates a block diagram of a video encoder in accordance to the present invention.

FIG. 3 shows a block diagram of a video encoder 30 according to the present invention. The video encoder 30 includes a RGB converter 310, subtractor 315, an image preclassifier 318, discrete cosine transform (DCT) block 320, quantizer 330, lossless coding stage 335, data rate controller 340, inverse quantizer 360, modified frame reconstruct block 365, and modified motion estimation block 370. As RGB data on line 308 is received, the RGB converter 310 codes the RGB data to luminance and two color difference components y,u, and v, respectively. The RGB converter 310 directs converted input frames on line 312 to the subtractor-315 which subtracts the output from the modified motion estimation block 370 with a current input frame. The output of the subtractor 315 is directed to the image preclassifier 318.

The image preclassifier 318 includes circuitry which identifies areas of a received image into active and inactive regions. The identified active regions are flagged to later receive a relatively fixed quantization by the quantizer 330. As the DCT block 320 receives the image with the preclassified regions, DCT coefficients are calculated. The quantizer 330 receives the DCT coefficients from the DCT block 320 and quantizes the DCT coefficients. The quantizer 330 determines a quantizer value for quantizing the DCT coefficients. The bigger the quantization value, the lower precision is the quantized DCT coefficient. Lower precision coefficients require fewer bits to represent.

The use of large quantization values allows the encoder 30 to selectively discard regions of the image with less activity. Since the image preclassifier 318 identified areas of the image into active and inactive regions, the quantizer 330 selectively limits the quantizer value within a relative fixed range for the active regions. No such constraints are imposed for the quantizer value for the inactive regions. Thus, by limiting the quantization value for the active regions of an image, the active regions are encoded with more precision than the inactive regions.

Quantized data on line 333 are applied to the lossless coding stage 335 and the inverse quantizer 360. The inverse quantizer 360 inverse quantizes the quantized data for frame reconstruction by the modified frame reconstruct block 365. The lossless coding stage 335 codes the quantized data for transmission on line 338. The data rate controller 338 monitors the rate of compressed data from the lossless coding stage 335 and provides the compressed data on line 350.

The quantizer 330 receives a data rate signal on line 345 from the data rate controller 340. The data rate signal on line 345 increases quantizer values of the quantizer 330 if the data rate controller determines that data rate limits on line 350 exceed predetermined set limits. Conversely, the data rate signal on line 345 decreases quantizer values of the quantizer 330 if the data rate controller 340 determines that data rate limits fall below predetermined set limits. Thus, the data rate controller 340 provides feed back to control the quantizer 330 to enable encoding having constant image quality at a variable data rate. Moreover, the image preclassifier 318 assures that active regions of an image are more precisely encoded by limiting the quantizer 330 discretion in quantizing the active regions while enabling more discretion for the quantizer 330 in quantizing the inactive regions of an image.

The modified frame reconstruct block 365 includes circuitry for automatic scene change detection and a reference picture controller. The automatic scene change detection determines whether input frames should be coded as intra frames instead of the normally predicted frames. Distortion measurements from frame encoding, differences in luminance, and color histograms determine similarity between temporally adjacent frames. When distortion measurements exceed an adaptively determined threshold, an intra frame is encoded instead of a predicted frame that is based on previously encoded frames. The adaptively determined threshold is derived by calculating an average of previous distortions, using either a sliding or autoregressive window. Distortion measurements for the current frame is compared to this average. If the current distortion measurements exceed the average significantly then the current frame is categorized as being an intra frame. The automatic scene detection and reference picture controller retains good image quality and improves error resilience of the bitstream: because intra frames aid a downstream decoder (not shown) in recynchronizing when bitstream errors occur.

The reference picture controller of the modified frame reconstruct block 365 determines whether the reference picture or an actual current picture is to be used during frame reconstruct. The reference picture controller includes a previous frame store and a reference picture store. The 333 previous frame store contains the previously encoded frame. The reference picture store contains a static background of a scene as well as the background concealed by the moving objects in the scene. This reference picture is built up over time by updating additional background information to the scene as new background is revealed by motion in the scene. For example, when a particular piece of previously unrevealed background is uncovered then that piece of background is written to the reference picture store, until that time the reference picture in that area contains the average value of the known data in the surrounding areas. Noise reduction is also performed on the reference picture.

The modified frame reconstruct block 365 encodes blocks of a current frame relative to the previously encoded frame and the reference frame and chooses the encoded blocks with the fewer encoded bits. For improved noise reduction, the modified frame reconstruct block 365 is biased to favor blocks encoded relative to the reference image. However, coding blocks of a current frame relative to both the previous input frame and the reference frame and choosing the encoded blocks with the least number of bits use excessive encoding resources.

Alternatively, by comparing the current frame with the previous frame and the reference frame and choosing either the previous frame or the reference frame as the basis for encoding the current frame alleviates multiple encodes of the current frame while improving the encode of the current frame. Based upon the comparison between the previous frame and the reference frame, the reference picture controller selects the frame that is most similar to the current frame. Updates to the reference frame occur when the average background differs significantly from the corresponding area in the reference frame. A built in by-pass for the reference frame controller conserves bandwidth when data bitrates exceed a predetermined bitrate. The by-pass circuitry generates a synthetic reference background as the reference frame and encodes the foreground regions in efforts to reduce frame reconstruct data bitrates.

In an alternative embodiment, the reference frame is synthetically generated and consists of animations controlled and generated by a Java applet. In the case of the synthetic background or animations, a selected portion of the real video is coded, this selected portion is then superimposed or blended with the reference frame for use in encoding the current frame.

The frame reconstruct data on line 366 from the modified frame reconstruct block 365 provides the input to the modified motion estimation block 370. The modified motion estimation block 370 includes circuitry for motion vector biasing which smoothes a motion vector field estimation. The modified motion estimation block 370 exploits the premise that when motion over an image is relatively smooth, the susceptibility of block matching performed by motion estimation to noise is deductible.

The modified motion estimation block 370 initializes a motion vector search of the surrounding areas with an initial condition equal to the average motion vector of surrounding areas to find an optimal vector. Of course, those skilled in the art will realize that other measures of smoothness other than the average can also be used. A motion vector biasor biases the optimal vector from the motion vector search to favor the direction consistent with that found in the surrounding areas. A modified distortion from the biased optimal vector is derived. The selected motion vector associated with the least distortion is directed to the subtractor 215. Motion vectors selected using the modified motion estimation to find the optimal vector with the lowest distortion produces an overall smoother motion vector field. The overall smoother motion vector field produces a more efficient coding leading to reduced bit rate and higher quality representation of scenes which contain smooth motion particularly in instances such as camera pans.

Moreover a similar strategy is adaptable to cope with other types of smooth motion image transformations such as zooms. It will be obvious to those persons skilled in the art to apply the current teachings to the other types of smooth motion image transformations.

Figure 4:
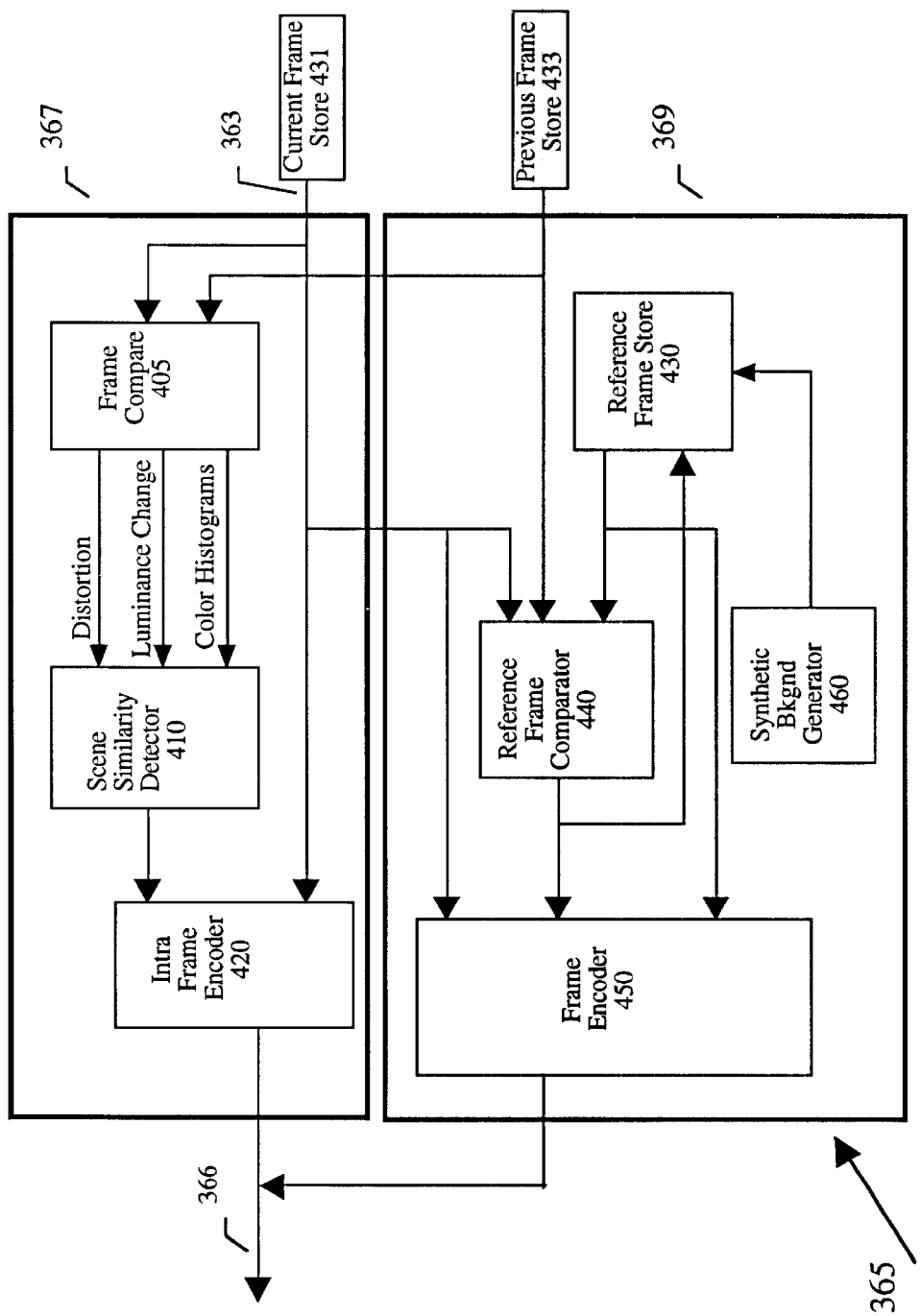
FIG. 4 illustrates a block diagram of the modified frame reconstruct block of the video encoder.

FIG. 4 illustrates a block diagram of the modified frame reconstruct block 370. The modified frame reconstruct block 365 includes circuitry for an automatic scene change detector 367, a reference picture controller 369, a current frame store 431, and previous frame store 433. The automatic scene change detector 367 includes a frame comparator 405, a scene similarity detector 410 and a frame encoder 420. The frame comparator 405 receives a current image from the current frame store 431 and a previous frame from the previous frame store 433 and makes a number of measurements for similarity by determining the differences in color histograms, luminance, and signal to noise ratio of a reconstructed image. The scene similarity detector 410 receives the differences in color histograms, luminance, and signal to noise ratio of a reconstructed image from the frame comparator 405. If the scene similarity detector 410 determines the measurements for the current image exceed an average value for the measured quantities, the scene similarity detector 410 directs the frame encoder 420 to encode the current image frame as an intra frame. Alternatively, if the scene similarity detector 410 determines the measurements for the current image are within an average value for the measured quantities, the scene similarity detector 410 directs the frame encoder 420 to encode the current image frame as a predicted frame based upon the previous frame.

The average value for the measured quantities provides an adaptively determined threshold which is derived by calculating the average of the previous measurements for similarity, using either a sliding or autoregressive window.

The reference picture controller 369 determines whether to use the reference picture or the previous picture as the picture upon which to reference the encoding of the current picture. The reference picture controller 369 includes a reference frame store 430, reference frame comparator 440, frame encoder 450, and a synthetic background generator 460 which includes generation of animation applets. The reference frame store 430 provides a reference frame which is generated as a combination of previous input frames. The previous frame store 433 provides the previously reconstructed frame which had been generated. The reference frame comparator 440 receives a current frame from the current frame store 431, the previously reconstructed frame from the previous frame store 433, and a reference frame from the reference store 430, and selects either the previous frame or the reference frame as the basis for encoding the current frame. The selected frame is the most similar frame to the current frame from the current frame store 431. The reference frame store 430 receives the selected frame from the reference frame comparator 440 for storage as the reference frame. The frame encoder 450 receives the current frame and the selected frame and encodes the current frame based on the selected frame, In an alternative embodiment, the reference frame store 430 includes a plurality of reference stores which are selectable as the reference frame. Updates to the reference frame store 430 occur when any of a number of conditions occur. Firstly, if the automatic scene detector 367 determines that a frame should be coded as an intra frame, the reference frame is replaced by the coded intra frame. Secondly, if a decoder (not shown) signals the use of a different reference frame for decoding, the reference frame controller 369 switches the reference frame to that used by the decoder. This situation occurs when the decoder detects error in the bitstream and signals the encoder that errors have been detected. Switching the reference frame to that of the decoders enables error to be repaired without the need for the encoder to send a new intra frame. Thirdly, if the reference frame has not been used for encoding some number of frames, i.e. it no longer represents the material in the video, the reference frame store 430 updates the reference frame to one that is used for encoding the current frame.

The synthetic background generator 460 provides synthetically generated backgrounds which may be provided by an attached computer system (not shown) to the reference frame store 433. The synthetic background generated 460 includes generation of animation by programs, such as Java running on the attached computer system. Furthermore, a built in by-pass for the reference picture controller 369 conserves bandwidth when data bitrates exceeds a predetermined bitrate. The by-pass circuitry directs the reference frame store 430 to provide synthetic backgrounds as the reference frames in which the frame encoder 450 encodes the foreground regions in efforts to reduce data bitrates.

Figure 5:
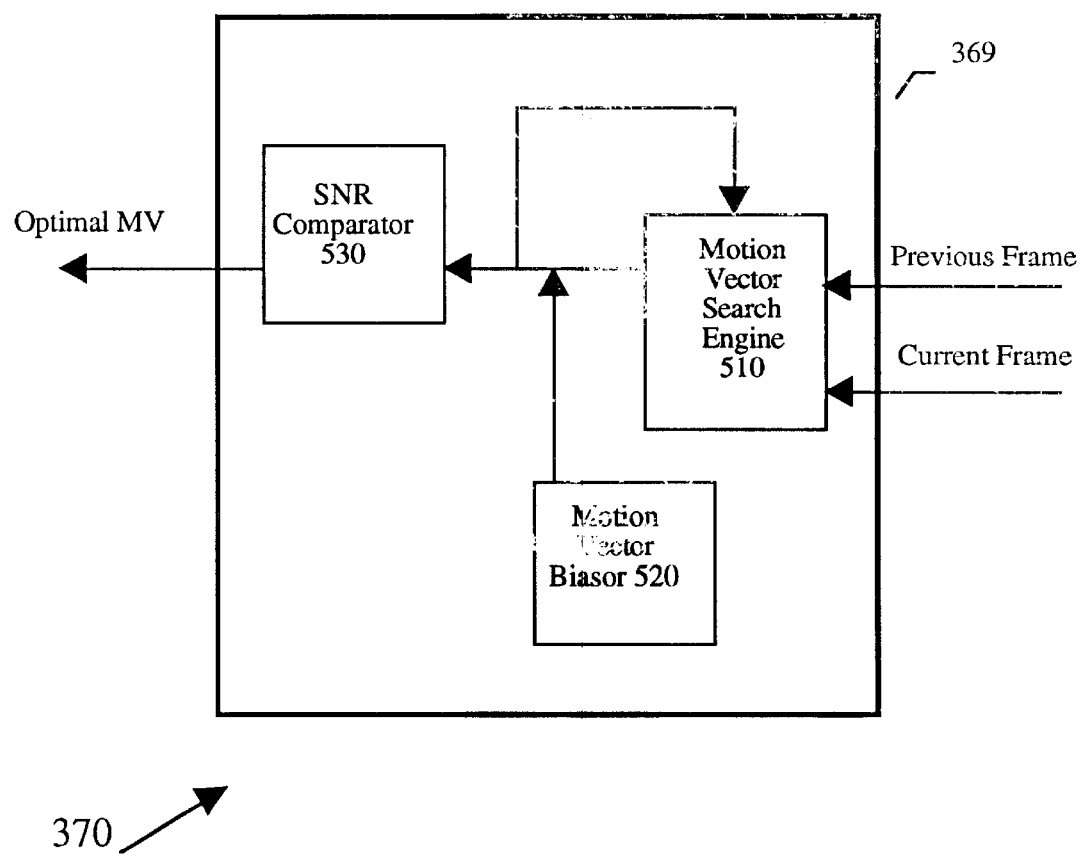
FIG. 5 illustrates a block diagram of the modified motion estimation block of the video encoder.

FIG. 5 illustrates a block diagram of the modified motion estimation block 370. The modified motion estimation block 370 includes a motion vector search engine 510, motion vector biasor 520, and a SNR comparator 530. The modified motion estimation block 370 receives a previous reconstructed frame and a current input frame. For each macroblock in the current frame, the modified motion estimation block 370 finds the best matching block in the previous reconstructed frame. The x and y offsets of this best matching block constitute the motion vectors. As the motion vector search engine 510 finds an optimal motion vector, the motion vector biasor 520 biases the optimal motion vector to favor the direction consistent with that found in the surrounding areas of the optimal motion vector and derives a modified distortion from the biased optimal vector.

For example, the motion vector search engine 510 initially finds an optimal vector (dx$_1$ dx$_2$) with a distortion dist$_{init}$. The motion vector biasor 520 subtracts a bias from the distortion dist$_{init}$ to provide a modified distortion dist$_{mod}$ where dist$_{mod}$=dist$_{init}$–bias. The motion vector search engine 510 performs additional searches in the direction consistent with the initial optimal vector (dx$_1$ dx$_2$). The SNR comparator 530 compares the SNR of the additional motion vector searches with the initial modified distortion dist$_{mod}$ and selects the motion vector associated with the minimum distortion. The selected motion vector associated with the least distortion is directed to the subtractor 215.

Motion vectors selected using the modified motion estimation to find the optimal vector with the lowest distortion produces an overall smoother motion vector field. Fewer bits are generated to code the motion vectors in this case because the actual coding of the motion vectors is done relative to surrounding motion vectors. In other words the encoded bitstream contains the difference between motion vectors not the; actual motion vectors i.e. delta coding. Since the modified motion estimation block 370 forces the motion vectors to point in roughly the same directions, the deltas between the motion vectors are smaller than would otherwise be the case. Thus, in situations such as camera pans and zooms, the overall smoother motion vector field extracts movement information from camera pans and zooms and provides movement parameters rather than encoding the movement information thereby reducing the number of encoded bits to represent the situations of camera panning or zooming.

While the foregoing detailed description has described several embodiments of the apparatus and methods for an intelligent encoder system in accordance with this invention, it is to be understood that the above description is illustrative only and not limiting of the disclosed invention. Obviously, many modifications and variations will be apparent to the practitioners skilled in this art. Accordingly, the apparatus and methods for an advanced intelligent encoder system have been provided. The advanced intelligent encoder system including variable rate coding, automatic scene change detection, reference picture controller, and refined motion estimation produces improved and smoother transitions between encoded images.

What is claimed is:

1. A video encoder for encoding input images having a plurality of data blocks to provide compressed image data comprising:

DCT (discrete cosine transformer) resources configured to DCT the data blocks;

quantizing resources coupled to the DCT resources configured to quantize the data blocks to provide quantized data blocks;

inverse quantizing resources coupled to the quantizing resources to inverse quantize the quantized data blocks;

frame reconstruction resources coupled to the inverse quantizing resources configured to reconstruct previous compressed frames;

motion estimation resources coupled to the frame reconstruction resources configured to provide predicted data blocks;

subtraction resources coupled to the DCT resources and the motion estimation resources to subtract the data blocks and the predicted data blocks;

image preclassifying resources coupled between the subtraction resources and the DCT resources configured to preclassify the data blocks as active and inactive regions wherein the quantizing resources responsive to preclassification of the data blocks limits quantizer values for the active regions; and a data rate output buffer coupled to the quantizing resources configured to provide a data rate signal to the quantizing resources for modifying quantizer values of the quantizing resources in order to maintain a particular target output data rate of the compressed image data wherein the frame reconstruction resources include an automatic scene change detector having a frame comparator configured to provide an average of a combination of distortion, differences in luminance, and color histogram information for comparing the previous frame with the current frame.

2. The video encoder of claim 1 wherein the frame reconstruction resources include a scene similarity detector configured to direct the current frame to be encoded as an intra frame when the combination of distortion, differences in luminance, and color histogram information exceed an adaptively determined threshold.

3. The video encoder of claim 1, wherein the frame reconstruction resources includes a reference picture controller configured to determine whether to code inverse quantized data blocks based upon a reference frame or a previous frame.

4. The video encoder of claim 3, wherein the reference picture controller includes:

a frame comparator configured to compare a previous frame and a reference frame with a current frame to determine whether the previous frame or the reference frame is more similar to the current frame; and a frame encoder coupled to the frame comparator configured to encode the current frame based on a selected more similar frame from the frame comparator.

5. The video encoder of claim 4, wherein the reference picture controller includes a reference picture store coupled to the frame encoder configured to receive updates of additional background information for the reference frame from the reference frame comparator.

6. The video encoder of claim 5, wherein the reference picture controller updates the reference picture store to include an intra frame whenever the current frame is encoded as the intra frame.

7. The video encoder of claim 3, wherein the reference picture controller includes a synthetic background generator which generates a synthetic background as the reference frame for encoding the current frame.

8. The video encoder of claim 7, wherein the synthetic background generator includes animation by a Java applet.

9. The video encoder of claim 1, wherein the motion estimation resources constrains motion vectors to be smooth relative to each other.

10. The video encoder of claim 9, wherein the motion estimation resources includes:

a motion vector search engine configured to receive a previous frame and a current frame to search an optimal motion vector;

a motion vector biasor coupled to the motion vector search engine configured to bias the optimal motion vector to favor a direction consistent with that found in surrounding areas of the optimal motion vector and provide a modified distortion; and a signal to noise ratio (SNR) comparator configured to compare SNR of additional motion vector searches performed by the motion vector search engine in a direction consistent with the optimal motion vector with the modified distortion to select the motion vector associated with minimum distortion.

11. A computer readable media video encoder for images having a plurality of data blocks comprising:

DCT (discrete cosine transformer) resources configured to DCT the data blocks;

quantizing resources coupled to the DCT resources configured to quantize the data blocks to provide quantized data blocks;

inverse quantizing resources coupled to the quantizing resources to inverse quantize the quantized data blocks;

frame reconstruction resources coupled to the inverse quantizing resources configured to determine whether to code inverse quantized data blocks as intra frames or predicted frames;

motion estimation resources coupled to the frame reconstruction resources configured to provide predicted data blocks which constrain motion vectors to be smooth relative to each other;

subtraction resources coupled to the DCT resources and the motion estimation resources to subtract the data blocks and the predicted data blocks; and an output data buffer coupled to the quantizing resources configured to provide a data rate signal to the quantizing resources for modifying quantizer values of the quantizing resources in order to maintain a particular target output data rate of the compressed image data wherein the frame reconstruction resources includes a reference picture controller configured to determine whether to code inverse quantized data blocks based upon a reference frame or a current frame and wherein the reference picture controller includes a synthetic background generator which generates a synthetic background based on animation by a java applet as the reference frame for encoding the current frame and a built in by-pass which conserves bandwidth data bitrates exceeds a predetermined bitrate.

12. A method of encoding input images having a plurality of data blocks to provide output image data comprising the steps:

DCTing (discrete cosine transformer) data blocks to provide reduced data blocks;

quantizing the reduced data blocks to provide quantized data blocks;

inverse quantizing the quantized data blocks to provide inverse quantized data blocks;

detecting a scene change to code inverse quantized data blocks as intra frames;

constraining motion vectors to be smooth relative to each other in motion estimation to provide predicted data blocks;

integrating the data blocks and the predicted data blocks to provide the output image data; and controlling quantizer values to regulate the image data rate to a predetermined set limit wherein the step of detecting a scene change includes comparing an average of a combination of distortion, differences in luminance, and color histogram information between a previous frame and a current frame.

13. The method of encoding input images according to claim 12 further comprising the step generating an animated background as a reference frame for encoding a current frame.

* * * * *